(12) United States Patent
Baba

(10) Patent No.: US 9,711,049 B2
(45) Date of Patent: Jul. 18, 2017

(54) COLLISION PROBABILITY DETERMINATION APPARATUS AND PROGRAM

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/471,343

(22) Filed: Aug. 28, 2014

(65) Prior Publication Data

US 2015/0066348 A1    Mar. 5, 2015

(30) Foreign Application Priority Data

Aug. 29, 2013 (JP) .................................. 2013-178364

(51) Int. Cl.
*G08G 1/16* (2006.01)
*B60W 30/095* (2012.01)
(Continued)

(52) U.S. Cl.
CPC ........... *G08G 1/166* (2013.01); *B60W 30/095* (2013.01); *G01S 13/931* (2013.01);
(Continued)

(58) Field of Classification Search
None
See application file for complete search history.

(56) References Cited

U.S. PATENT DOCUMENTS

2011/0288774 A1* 11/2011 Bengtsson ............... G08G 1/16
701/301

FOREIGN PATENT DOCUMENTS

| CN | 101395647 A | 3/2009 |
| JP | 2002-274301 | 9/2002 |

(Continued)

OTHER PUBLICATIONS

Office Action dated Jun. 23, 2015, issued in the corresponding JP application No. 2013-178364 with English translation.
(Continued)

*Primary Examiner* — Mussa A Shaawat
*Assistant Examiner* — Kyung Kim
(74) *Attorney, Agent, or Firm* — Harness, Dickey & Pierce, P.L.C.

(57) ABSTRACT

A collision probability determination apparatus includes a specifying means for specifying target positions on an X-Y plane, a calculation means for calculating a target path and calculating a predicted arrival position of the target on an X-axis, a determination means for determining probability of a collision between the vehicle and the target based on the predicted arrival position; and a calculation origin changing means for defining the target position specified last time as a last specified value, and defining the target position specified this time as a current specified value, and for, when detecting that the target path, whose end point is the last specified value, is a straight line and then if a difference value between X-coordinates of the last specified value and the current specified value exceeds a predetermined threshold, changing a calculation origin of the target path to the last specified value or the current specified value.

5 Claims, 5 Drawing Sheets

(51) Int. Cl.
*G01S 13/93* (2006.01)
*G01S 13/86* (2006.01)

(52) U.S. Cl.
CPC ..... *B60W 2420/42* (2013.01); *B60W 2420/52* (2013.01); *G01S 13/867* (2013.01)

(56) References Cited

FOREIGN PATENT DOCUMENTS

| JP | 2004-103018 | 4/2004 |
| JP | 2004-227122 | 8/2004 |
| JP | 2007-087203 A | 4/2007 |
| JP | 2007-317018 | 12/2007 |
| JP | 2009-104226 | 5/2009 |

OTHER PUBLICATIONS

Office Action mailed Nov. 8, 2015, issued in the corresponding Korean Application No. 10-2014-0113766 with English translation.

\* cited by examiner

COLLISION PROBABILITY DETERMINATION APPARATUS AND PROGRAM

CROSS-REFERENCE TO RELATED APPLICATION

This application is based on and claims the benefit of priority from earlier Japanese Patent Application No. 2013-178364 filed Aug. 29, 2013, the description of which is incorporated herein by reference.

BACKGROUND

Technical Field

The present invention relates to a collision probability determination apparatus, which is installed in a vehicle and determines probability of a collision between the vehicle and a target detected by a radar, a camera and the like, and a program.

Related Art

A collision avoidance system for a vehicle is required to accurately determine probability of a collision between a vehicle and a target such as another vehicle and a pedestrian. For example, in JP-A-2004-103018, a relative movement path (trace) of a detected target with respect to a vehicle is obtained to determine the probability of a collision. Specifically, according to the configuration of JP-A-2004-103018, a plurality of data indicating position coordinates of a target detected by two infrared cameras are calculated during a monitoring period. Then, a straight line is obtained as the relative movement path. A mean value of the squares of the distances from the data points to a straight line becomes the minimum.

According to the configuration disclosed in JP-A-2004-103018, it can be considered that a predicted arrival position of the target on an X axis indicating the width direction of the vehicle with reference to the position of the vehicle is calculated based on the relative movement path, and probability of a collision is determined based on the calculated predicted arrival position. However, since the relative movement path is calculated with averaging by using past data, the calculation result is averaged by the past data even when the movement direction of the target is suddenly changed. Hence, the accuracy in calculating the predicted arrival position is lowered. As a result, collision probability cannot be appropriately determined.

SUMMARY

An embodiment provides a collision probability determination apparatus which prevents probability of a collision between a vehicle and a detected target from being erroneously determined.

As an aspect of the embodiment, a collision probability determination apparatus is provided. The apparatus is installed in a vehicle. The apparatus includes: a specifying means for specifying, of a target detected in a traveling direction of the vehicle, target positions, which are positions of the target on an X-Y plane, on which a width direction of the vehicle is defined as an X-axis with reference to a position of the vehicle, and a longitudinal direction of the vehicle is defined as a Y-axis with reference to the position of the vehicle; a calculation means for calculating a target path, which is a path of the target position on the X-Y plane, by using the target positions specified by the specifying means several times, and calculating a predicted arrival position of the target on the X-axis based on the calculated target path; a determination means for determining probability of a collision between the vehicle and the target based on the predicted arrival position calculated by the calculation means; and a calculation origin changing means for defining the target position specified last time by the specifying means as a last specified value, and defining the target position specified this time by the specifying means as a current specified value, and for, when detecting that the target path, whose end point is the last specified value, is a straight line or has a shape related to a straight line and then if a difference value between an X-coordinate of the last specified value and an X-coordinate of the current specified value exceeds a predetermined threshold, changing a calculation origin of the target path calculated by the calculation means to the last specified value or the current specified value.

DETAILED DESCRIPTION OF THE PREFERRED EMBODIMENTS

With reference to the accompanying drawings, hereinafter are described embodiments of the present invention.

<General Configuration>

Figure 1:
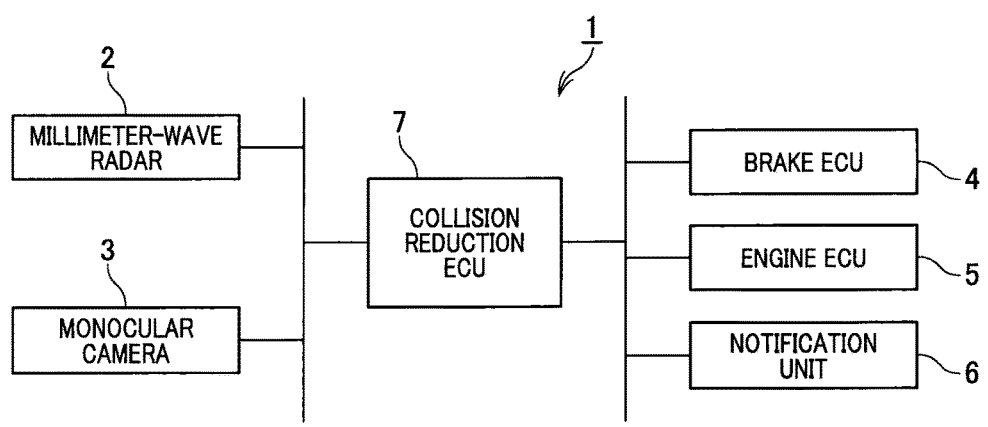
FIG. 1 is a block diagram showing a configuration of a collision reduction apparatus according to an embodiment.

A collision reduction apparatus 1 shown in FIG. 1 is installed in a vehicle. The collision reduction apparatus 1 includes a millimeter-wave radar 2, a monocular camera 3, a brake ECU (electronic control unit) 4, an engine ECU 5, a notification unit 6, and a collision reduction ECU 7. In the collision reduction apparatus 1, the collision reduction ECU 7 is connected to the millimeter-wave radar 2, the monocular camera 3, the brake ECU 4, the engine ECU 5, and the notification unit 6 so as to communicate with each other. Note that the configuration realizing communication is not particularly limited. In addition, instead of the millimeter-wave radar 2, another in-vehicle radar may be used which uses radar waves or ultrasonic waves. Instead of the monocular camera 3, a stereo camera may be used.

The millimeter-wave radar 2 is used for detecting a target (another vehicle, a pedestrian or the like) by using millimeter waves. The millimeter-wave radar 2 is mounted on the center (head) at the front side of an own vehicle (the vehicle in which the collision reduction apparatus 1 is installed). The millimeter-wave radar 2 transmits millimeter waves ahead of the own vehicle while scanning a horizontal plane with the millimeter waves, and receives the reflected millimeter waves, thereby obtaining transmitted and received data. The millimeter-wave radar 2 transmits the transmitted and received data as a radar signal to the collision reduction ECU 7.

The monocular camera 3 includes one CCD camera and is mounted on the center at the front side of the own vehicle. The monocular camera 3 transmits data of an image taken by the CCD camera as an image signal to the collision reduction ECU 7.

The brake ECU 4 is an electronic control unit which controls braking of the own vehicle and includes a CPU, a ROM, and a RAM. Specifically, the brake ECU 4 controls a brake ACT, which is an actuator opening and closing a pressure increase control valve and a pressure decrease control valve provided in a brake hydraulic pressure circuit, depending on a detection value of a sensor which detects the depressing amount of a brake pedal. In addition, the brake ECU 4 controls a throttle ACT so as to increase braking force of the own vehicle in accordance with an instruction issued from the collision reduction ECU 7.

The engine ECU 5 is an electronic control unit which controls start/stop, fuel injection quantity, ignition timing and the like of an engine. The engine ECU 5 includes a CPU, a ROM, and a RAM. Specifically, the engine ECU 5 controls the throttle ACT, which is an actuator opening and closing a throttle provided to a suction pipe, depending on a detection value of a sensor which detects the depressing amount of an accelerator pedal. In addition, the engine ECU 5 controls the throttle ACT so as to decrease driving force of an internal combustion engine in accordance with an instruction issued from the collision reduction ECU 7.

When the notification unit 6 receives an alarm signal from the collision reduction ECU 7, the notification unit 6 provides notification to the driver of the vehicle by using sound, light or the like.

The collision reduction ECU 7 is an electronic control unit which integrally controls the collision reduction apparatus 1. The collision reduction ECU 7 includes a CPU, a ROM, and a RAM. The collision reduction ECU 7 receives a radar signal from the millimeter-wave radar 2 and an image signal from the monocular camera 3 at regular time intervals based on a master clock of the CPU.

<Collision Probability Determination Method>

Figure 2:
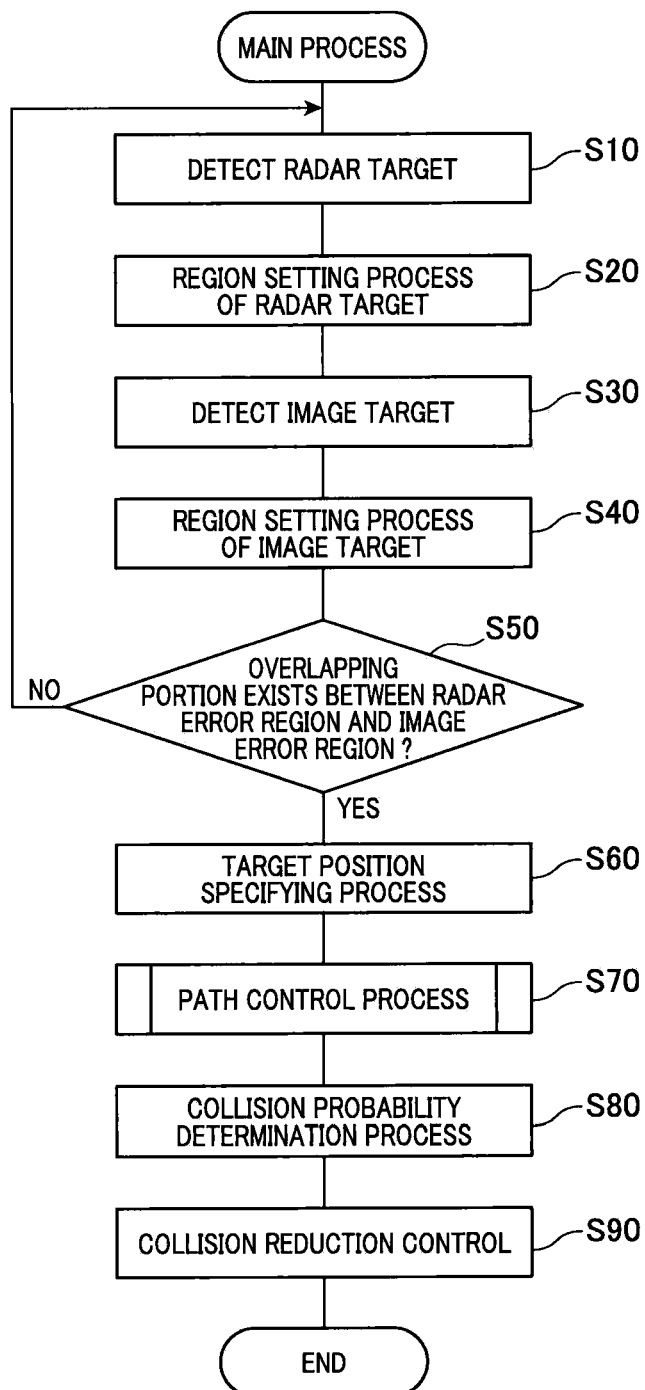
FIG. 2 is a flowchart of a main process (step) executed by a collision reduction ECU according to the embodiment.

Next, a collision probability determination method, which includes a target detection method and the like, performed by the collision reduction apparatus 1 is explained. In the ROM (non-transitory computer readable recording medium) of the collision reduction ECU 7, a determination program is stored which is a program for realizing collision probability determination, which includes target detection, by the collision reduction apparatus 1 (computer). Hereinafter, a process (step) (main process (step)) performed by the collision reduction ECU 7 according to the determination program is explained with reference to a flowchart shown in FIG. 2. Note that the main process (step) shown in FIG. 2 is repeatedly performed in predetermined cycles.

Figure 3:
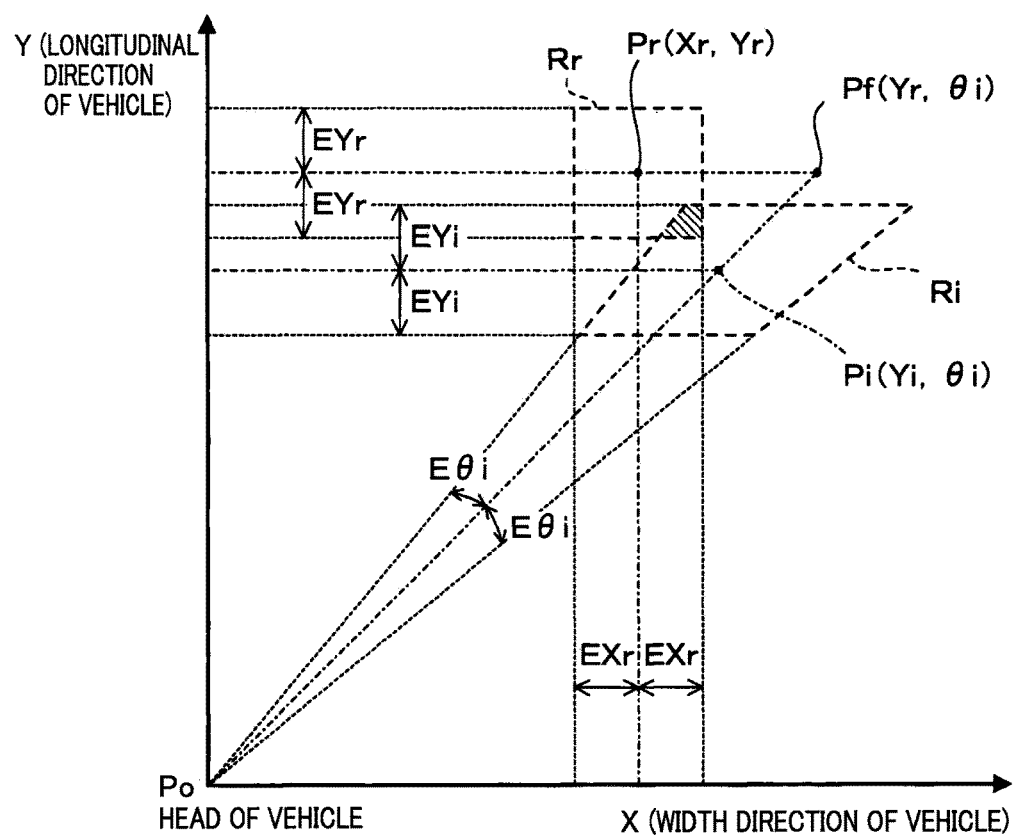
FIG. 3 is a diagram showing an error region set in the embodiment.

First, the collision reduction ECU 7 detects a target based on a radar signal transmitted from the millimeter-wave radar 2 (detection information from the millimeter-wave radar 2) (S10). Specifically, the collision reduction ECU 7 calculates (specifies) the shortest distance from the own vehicle to the target and the position of the target in the horizontal direction (angular position). Then, as shown in FIG. 3, based on the calculation result, the collision reduction ECU 7 calculates (specifies) a position coordinate (X-coordinate and Y-coordinate) of the target on the X-Y plane as a detection point Pr of the target on the X-Y plane. On this X-Y plane, the width direction of the own vehicle (lateral direction) is defined as an X-axis, and the longitudinal direction of the own vehicle (front-back direction) is defined as a Y-axis. In addition, on this X-Y plane, the end position of the own vehicle (the position at which the millimeter-wave radar 2 is provided) is set as a reference point Po, and the detection point Pr of the target indicates a relative position with respect to the reference point Po. Note that FIG. 3 shows an example of the target positioned in the front and right direction of the own vehicle. In addition, in S10, the collision reduction ECU 7 calculates relative speed between the target and the own vehicle in addition to the detection point Pr of the target. Hereinafter, the target detected in S10 (a target detected based on the detection information of the millimeter-wave radar 2) is referred as "radar target".

Next, as shown in FIG. 3, the collision reduction ECU 7 sets a radar error region Rr centering therein the detection point Pr of the radar target calculated in S10 (S20). Specifically, the collision reduction ECU 7 sets a region having a width corresponding to an assumed error, which is previously set based on characteristics of the millimeter-wave radar 2, as the radar error region Rr for each of the X-coordinate and the Y-coordinate, with reference to the X-coordinate and the Y-coordinate of the detection point Pr of the radar target.

For example, if the detection point Pr is expressed as $(Xr, Yr)$, the assumed error of the X-coordinate is expressed as $\pm EXr$, and the assumed error of the Y-coordinate is expressed as $\pm EYr$, then the range of the X-coordinate of the radar error region Rr is expressed as: $Xr-EXr \leq X \leq Xr+EXr$, and the range of the Y-coordinate of the radar error region Rr is expressed as: $Yr-EYr \leq Y \leq Yr+EYr$. Note that expression of the radar error region Rr is not limited to the above. For example, the radar error region Rr may be expressed by using an assumed error of the Y-coordinate and an assumed error of the horizontal direction position.

Next, the collision reduction ECU 7 detects a target based on an image signal transmitted from the monocular camera 3 (image taken by the monocular camera 3) (S30). Specifically, the collision reduction ECU 7 analyzes an image indicated by the image signal to identify the target. This identification is made by, for example, a matching process (step) using a previously registered target model. Since the target model is prepared for each type of target (vehicle, pedestrian, bicycle, tricycle or the like), the type of target is also identified. Then, the collision reduction ECU 7 specifies the Y-coordinate on the X-Y plane based on the position of the target in the top and bottom direction on the image and the position of a focus of expansion (FOE) on the image. The collision reduction ECU 7 specifies the horizontal direction position (angular position) of the target based on the position of the target in the left and right direction on the image.

That is, as the position of the target in the front-back direction of the own vehicle is further (the Y-coordinate thereof is larger), the lower end position of the target on the image tends to be higher. Hence, the Y-coordinate can be specified based on the predetermined focus of expansion on the road surface on the image and the height of the end position of the target. Note that the identification method described above is characterized in that detection accuracy of the Y-coordinate becomes lower when the lower end position of the target is not accurately detected.

In addition, as the shift amount in the angular direction of the target with reference to the front-back direction of the own vehicle (specifically, the straight line of $X=0$) is larger, the shift amount of the target in the left and right direction on the image with reference to the focus of expansion tends to be larger. Hence, the horizontal direction position of the target can be specified based on the distance from the focus of expansion on the image to a vertical line passing through the center of the target.

That is, in S30, as shown in FIG. 3, the collision reduction ECU 7 specifies the Y-coordinate and the horizontal direction position (angular position) of the center of the target on the X-Y plane as a detection point Pi of the target on the X-Y plane. Note that, hereinafter, the target detected in S30 (the target detected based on the image taken by the monocular camera 3) is referred to as "image target".

Next, as shown in FIG. 3, the collision reduction ECU 7 sets an image error region Ri centering therein the detection point Pi of the image target calculated in S30 (S40). Specifically, the collision reduction ECU 7 sets a region having a width corresponding to an assumed error based on the target width, which is a width along the X-axis of the image target, as an image error region Ri for each of the Y-coordinate and the horizontal direction position, with reference to the Y-coordinate and the horizontal direction position of the detection point Pi.

For example, if the detection point Pi is expressed as (Yi, θi), and the assumed error of the Y-coordinate is expressed as ±EYi, then the range of the Y-coordinate of the image error region Ri is expressed as: $Yi-EYi \leq Y \leq Yi+EYi$. The assumed error of the horizontal direction position is expressed as: $\theta i-E\theta i \leq \theta i \leq \theta i+E\theta i$. That is, the range of the image error region Ri in the X-axis direction is specified as a direction range of a constant angle $2E\theta i$ including the horizontal direction position θi of the image target calculated based on the width of the image target (target width) measured based on the image.

Next, the collision reduction ECU 7 determines whether or not an overlapping portion (overlapping region) exists between the radar error region Rr and the image error region Ri on the X-Y plane (S50).

If the collision reduction ECU 7 determines that no overlapping portion exists in S50 (S50: NO), the collision reduction ECU 7 determines that the radar target and the image target are not the same, and the process returns to S10. In contrast, if the collision reduction ECU 7 determines that the overlapping portion (hatched area in FIG. 3) exists in S50 (S50: YES), the collision reduction ECU 7 determines that the radar target and the image target are the same, and the process proceeds to the next step S60.

Next, the collision reduction ECU 7 specifies a position Pf, which is specified by a Y-coordinate Yr of the detection point Pr of the radar target and the horizontal direction position θi of the image target, as a target position which is a position of the target (the target determined as the same) on the X-Y plane (S60). Note that the target position of each target specified in S60 is stored in the RAM or the like in time sequence. That is, in the storage section of the collision reduction ECU 7, data indicating a target position is stored every time the target position is specified in S60.

Next, the collision reduction ECU 7 performs a path control process (step) for calculating a predicted arrival position, which is on the X axis of the X-Y plane, of the target whose position is specified in S60 (hereinafter, referred to as "specified target"), based on a plurality of data stored in the storage section such as the RAM (S70). The process (step) (path control process (step)) of S70 is described later in detail. Note that, in the storage section of the collision reduction ECU 7, data indicating a target path is stored every time the target path described later is calculated in S70.

Next, the collision reduction ECU 7 determines probability of a collision between the own vehicle and the specified target based on the predicted arrival position of the specified target calculated in S70 (S80). Specifically, in S80, the collision reduction ECU 7 determines whether or not the predicted arrival position of the specified target exists within a range having a width of the own vehicle and a width corresponding to a predetermined assumed error (hereinafter, referred to as "vehicle position range"), centering on the reference point Po on the X-Y plane. Then, if the predicted arrival position exists within the vehicle position range, the collision reduction ECU 7 determines that the probability of a collision is higher. If the predicted arrival position exists outside the vehicle position range, the collision reduction ECU 7 determines that the probability of a collision is lower.

Finally, the collision reduction ECU 7 performs a collision reduction control depending on the probability of a collision determined in S80 and the target position specified in S60 (S90). For example, in a case where the probability of a collision is higher, when the distance from the own vehicle to the target position becomes a predetermined first threshold distance D1, or TTC (Time to Collision) becomes a predetermined first threshold time T1, the collision reduction ECU 7 transmits an alarm signal to the notification unit 6 and provides notification to the driver. In addition, in a case where the probability of a collision is higher, when the distance from the own vehicle to the target position becomes a predetermined second threshold distance D2 (<D1), or TIC becomes a predetermined second threshold time T2 (<T1), the collision reduction ECU 7 provides an instruction to the engine ECU 5 to decrease driving force of the internal combustion engine. In addition, in a case where the probability of a collision is higher, when the distance from the own vehicle to the target position becomes a predetermined third threshold distance D3 (<D2), or TTC becomes a predetermined third threshold time T3 (<T2), the collision reduction ECU 7 provides an instruction to the brake ECU 4 to increase braking force of the own vehicle. Note that the timing of the above control may be changed depending on the percentage of the area of the overlapping portion (shaded portion shown in FIG. 3) with respect to those of the radar error region Rr and the image error region Ri. For example, the collision reduction ECU 7 considers that confidence of the target position is higher as the percentage is higher. In this case, the collision reduction ECU 7 can advance the timing of the control. The collision reduction ECU 7 considers that confidence of the target position is lower as the percentage is lower. In this case, the collision reduction ECU 7 can delay the timing of the control compared with the case where the confidence is higher.

<Path Control Process>

Next, the process (step) (path control process (step)) of S70 is explained.

Figure 4:
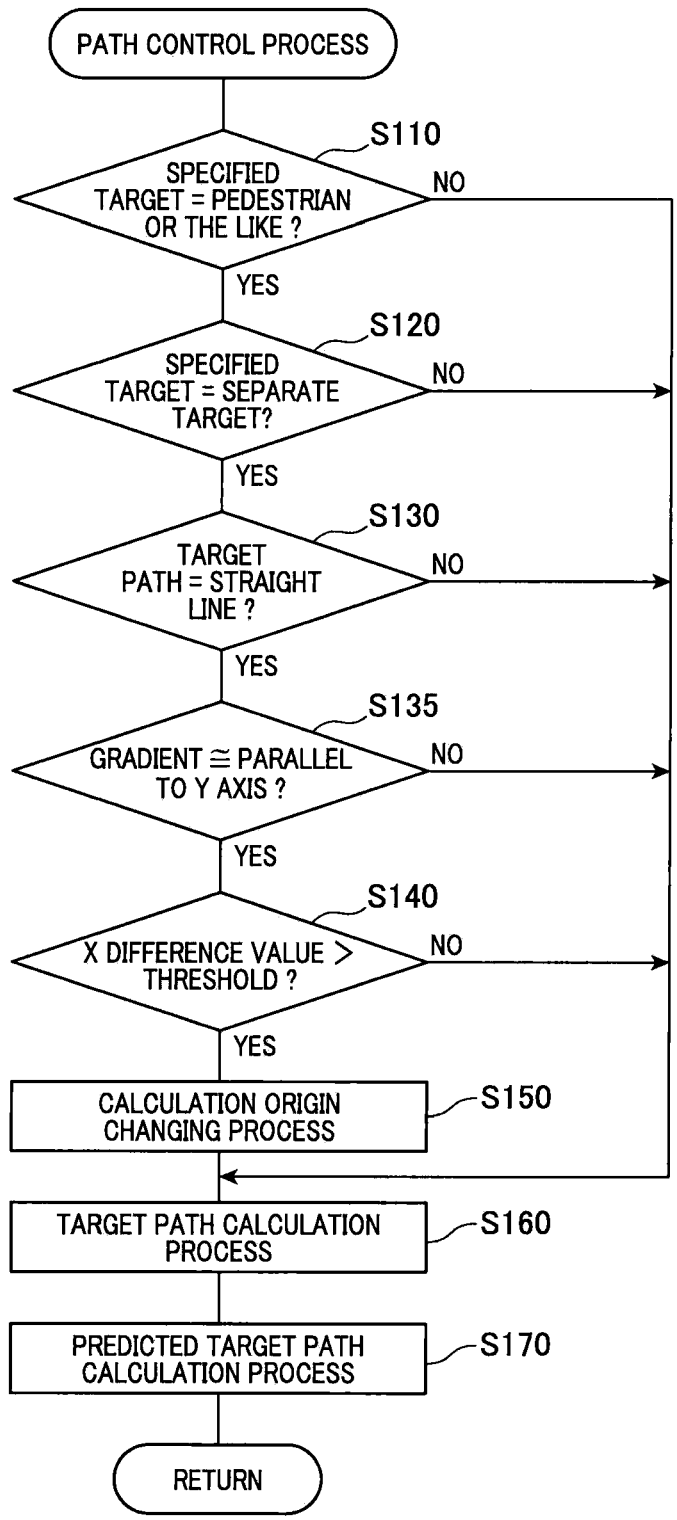
FIG. 4 is a flowchart of a process (step) in S70 of the embodiment.

In the process (step) of S70, in FIG. 4, the collision reduction ECU 7 determines whether or not the type of image target (i.e. specified target) is a pedestrian or a target related to a pedestrian (hereinafter, referred to as "pedestrian or the like") based on the image target detected in S30 (target detected based on the image taken by the monocular camera 3) (S110). Note that the target related to a pedestrian is, for example, a tricycle or a bicycle. That is, the difference between the maximum speed of the target related to a pedestrian and that of a person is assumed to be smaller than the difference between the maximum speed of the target related to a pedestrian and that of a vehicle. If the collision reduction ECU 7 determines that the type of the specified target is a pedestrian or the like (S110: YES), the path control process (step) proceeds to the next step S120.

In contrast, if the collision reduction ECU 7 determines that the type of the specified target is not a pedestrian or the like (S110: NO), regarding the specified target, e.g. a vehicle or the like, which is not a pedestrian or the like, the collision reduction ECU 7, by using detection points (hereinafter, referred to as "data points") indicated by a plurality of data indicating target positions stored in the stored section, calculates, for example, an approximate straight line or an approximate curved line, in which a mean value of the squares of the distances from the data points becomes the minimum, as a target path which is a path of the specified target (S160).

In this case (S110: NO), the collision reduction ECU 7 defines, regarding the specified target, the oldest data point P1 (see FIG. 4A) stored in the storage section as a calculation origin (starting point), and calculates a target path by using all the data points stored in the storage section. The collision reduction ECU 7 calculates a predicted arrival position, which is a position (X-coordinate) on the X-Y plane, based on the target path calculated in S160 (S170). The predicted arrival position is a position which the specified target is predicted to reach when the specified target reaches the X axis. Then, the path control process (step) returns to S80. Specifically, the collision reduction ECU 7 calculates a predicted target path formed by extending the target path in the direction along which values of the Y-coordinate becomes smaller, based on the gradient or the curvature of the target path, and calculates an intersection between the predicted target path and the X-coordinate as the predicted arrival position.

Next, following S110, the collision reduction ECU 7 determines whether or not the specified target determined as a pedestrian or the like is a target existing at a position separated from the own vehicle in the X-axis direction (hereinafter, referred to as "separate target") on the X-Y plane, based on the target position specified in S60 (S120).

Specifically, for example, if the X-coordinate of the specified target is within the vehicle position range, the collision reduction ECU 7 determines that the specified target is a separate target. If the X-coordinate of the specified target is outside the vehicle position range, the collision reduction ECU 7 determines that the specified target is not a separate target, in other words, the specified target is a target which exists ahead of the own vehicle on the route on which the own vehicle travels (hereinafter, referred to as "preceding target"). If the collision reduction ECU 7 determines that the specified target is a separate target in S120, the path control process (step) proceeds to the next step S130.

Figure 5A:
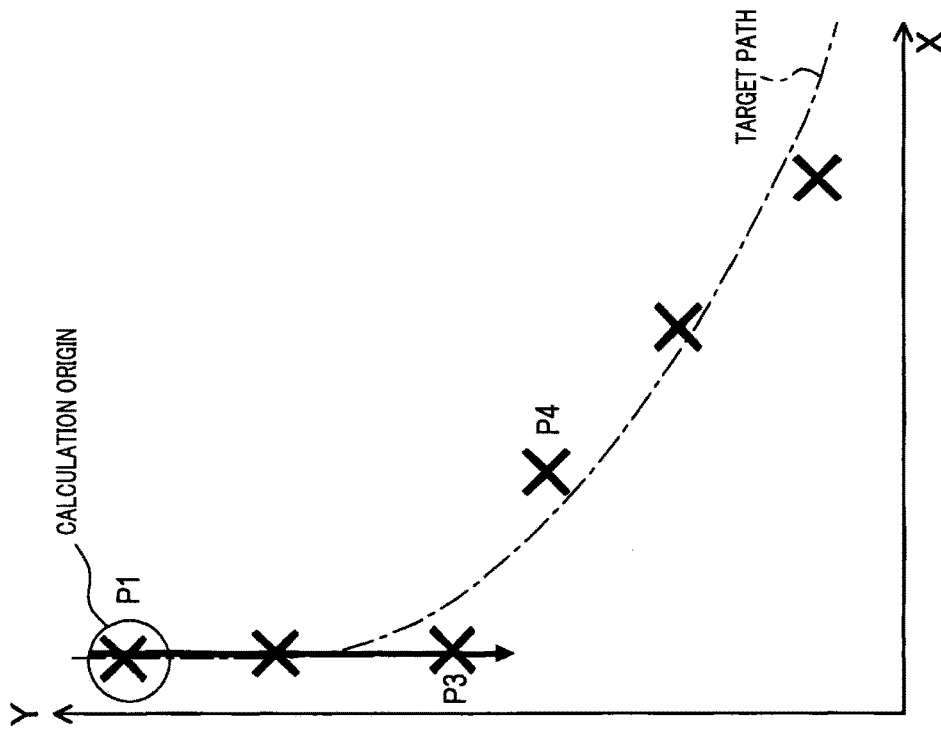
FIG. 5A is a drawing showing a target path obtained when a calculation origin is changed.

In contrast, if the collision reduction ECU 7 determines that the specified target is not a separate target in S120, the collision reduction ECU 7 defines, regarding the specified target (e.g. preceding target), the oldest data point (e.g. P1 shown in FIG. 5A, or the data point changed in the main process (step) before the last if the data point has changed) as a calculation origin (starting point), and calculates the target path (S160), and calculates the predicted target path (S170). After the calculation, the path control process (step) returns to S80.

Next, the collision reduction ECU 7 reads, regarding the specified target determined as a separate target of a pedestrian or the like, data indicating the target path stored in the storage section by the last main process (step) (specifically, S70, S160). Then, the collision reduction ECU 7 determines whether or not the target path indicated by the read data (or a shape proximate to the target path) is obtained by straight-line approximation on the X-Y plane (S130). That is, according to the determination of S130, it can be estimated (detected) that the target path, whose end point is the target position specified in the last main process (step) (specifically, S60), is a straight line or has a shape related to a straight line. In step S130, if the collision reduction ECU 7 detects that the target path of the specified target is a straight line or has a shape related to a straight line (S130: YES), the path control process (step) proceeds to the next step S135.

In contrast, if the collision reduction ECU 7 does not detect that the target path of the specified target is a straight line or has a shape related to a straight line (S130: NO), the collision reduction ECU 7 defines, regarding the specified target (e.g. a target whose target path has a curved shape), the oldest data point (the data point changed in the main process (step) before the last if the data point has been changed) as a calculation origin (starting point), and calculates the target path (S160). Then, the collision reduction ECU 7 calculates the predicted target path (S170). After the calculation, the path control process (step) returns to S80.

Next, the collision reduction ECU 7 determines whether or not the gradient of a proximate part of the target path indicated by the data read in S130 is parallel to the Y axis on the X-Y plane (S135). That is, if the gradient of the part indicated by a predetermined number of times of data values measured immediately before including a last specific value, described later, is parallel to the Y axis (or the gradient is within a predetermined range with reference to the parallel gradient), the collision reduction ECU 7 can easily determine that the specified target is stopped (or was stopped), or is moving (or was moving) in the travelling direction of the own vehicle. Strictly speaking, since the X-Y plane shows relative target positions with respect to the own vehicle, if the target path is parallel to the Y axis when the own vehicle is traveling in a straight line, the specific target is stopped or is traveling in a straight line along the traveling direction of the own vehicle. However, in the present embodiment, to facilitate the process, a state where the specified target is stopped is estimated (detected) as described above.

According to the determination in S135, if the collision reduction ECU 7 detects the stop of the specified target or the movement of the own vehicle in the travelling direction (S135: YES), the path control process (step) proceeds to the next step S140. In contrast, if the collision reduction ECU 7 does not detect the stop of the specified target or the movement of the own vehicle in the travelling direction (S135: NO), the collision reduction ECU 7 defines, regarding the specified target, the oldest data point (the data point changed in the main process (step) before the last if the data point has been changed) as a calculation origin (starting point), and calculates the target path (S160). Then, the collision reduction ECU 7 calculates the predicted target path (S170). After the calculation, the path control process (step) returns to S80.

Next, the collision reduction ECU 7 determines, regarding the specified target which is determined as a separate target such as a pedestrian or the like whose stop or movement in the traveling direction is detected, whether or not the difference value between the X-coordinate of the target position specified in the current main process (step) (hereinafter, referred to as "current process (step)") and the X-coordinate of the target position specified in the last main process (step) (hereinafter, referred to as "last process (step)") exceeds a predetermined movement threshold Bth (S140).

That is, as shown in FIG. 5A, if the difference value between a last specified value P3 and a current specified value P4 of the target positions on the X-coordinate exceeds the movement threshold Bth, the collision reduction ECU 7 can determine that movement of the specified target is sharply changed in the X-axis direction. If the difference value is equal to or less than the movement threshold Bth, the collision reduction ECU 7 can determine that movement of the specified target is not sharply changed in the X-axis direction.

According to the determination in S140, if the collision reduction ECU 7 detects the sharp change described above (S140: YES), the path control process (step) proceeds to the next step S150. In contrast, if the collision reduction ECU 7 does not detect the sharp change (S140: NO), the collision reduction ECU 7 defines, regarding the specified target, the oldest data point (the data point changed in the main process (step) before the last if the data point has been changed) as a calculation origin (starting point), and calculates the target path (S160). Then, the collision reduction ECU 7 calculates the predicted target path (S170). After the calculation, the path control process (step) returns to S80.

Next, regarding the specified target, which is a separate target such as a pedestrian or the like whose stop or movement in the travelling direction is detected and which is determined that movement thereof is sharply changed in the X-axis direction, the collision reduction ECU 7 changes the calculation origin, which is used when calculating the target path in S160, for example, from the data point P1 (see FIG. 5A) to the target point (last specified value P3) specified in the last process (step) (S150).

Then, the collision reduction ECU 7 defines, regarding the specified target, the last specified value P3 of the data points (see FIG. 5A) as a calculation origin (starting point), and calculates the target path based on the last specified value P3 and the current specified value P4 (S160). Then, the collision reduction ECU 7 calculates the predicted target path (S170). After the calculation, the path control process (step) returns to S80.

ADVANTAGES

As described above, according to the collision reduction apparatus 1, target positions regarding the target detected in the traveling direction of the own vehicle are specified several times in time sequence. For example, a straight line or a curved line, in which a mean value of the squares of the distances from the specified values becomes the minimum, is obtained as a target path. Hence, the influence of an error of the position detection can be reduced to accurately determine probability of a collision between the own vehicle and the detected target.

Figure 5B:
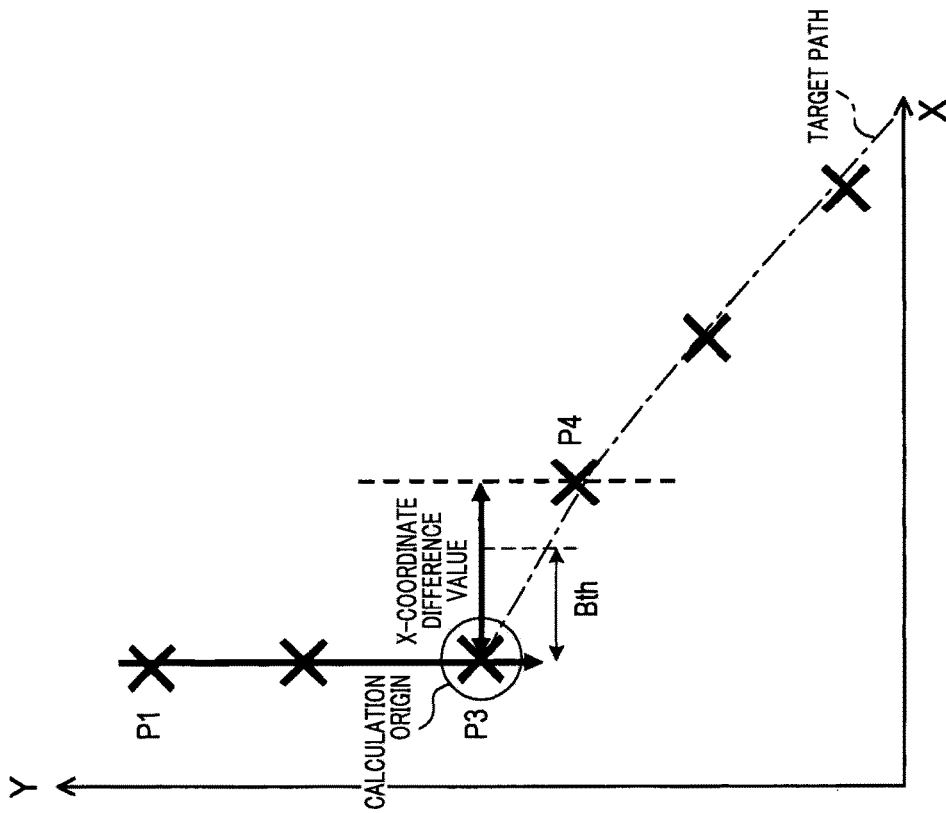
FIG. 5B is a drawing showing a target path obtained when a calculation origin is not changed.

However, when movement of the target is sharply changed, if the target path is calculated on average by using the target positions which are specified several times in the past, as shown in FIG. 5B, the result of the calculation is averaged by the past data. Hence, the accuracy in calculating the predicted arrival position is lowered. As a result, collision probability can be erroneously determined.

To solve the problem, when the collision reduction apparatus 1 detects, based on the shape of the target path of the X-Y plane, that the shape is a straight line or a shape related to a straight line, after the detection, if the difference value between the last specified value P3 and the current specified value P4 of the target position on the X-coordinate exceeds the movement threshold Bth, the collision reduction apparatus 1 changes the calculation origin of the target path calculated in S160, for example, from the data value P1 to the last specified value P3 of the target point.

According to the above configuration, the accuracy in calculating the predicted arrival position can be prevented from being lowered. That is, when the movement direction of the target is sharply changed from the stopped state or the direction along the Y axis to the X axis direction (lateral direction), the collision reduction ECU 7 recalculates the target path from the current specified value (last specified value) without using the past data values (specified values) specifying the past stopped state or movement state. Hence, the target path is calculated as a path in which the sharp change in the movement direction of the target is heavily weighted without being averaged by the past data values (specific values of the processes (steps) before the last). Hence, according to the collision reduction apparatus 1, the accuracy in calculating the predicted arrival position can be prevented from being lowered. As a result, probability of a collision between the own vehicle and the detected target can be prevented from being erroneously determined.

In addition, according to the collision reduction apparatus 1, only when the gradient of a proximate part of the target path calculated in the last process (step) is within a predetermined range with reference to a gradient parallel to the Y axis on the X-Y plane, the change of the calculation origin obtained in S150 is permitted. Hence, as described above, it can be easily determined whether the specified target is stopped (or has been stopped) or not, or is moving (or has been moving) along the traveling direction of the own vehicle or not.

In addition, regarding the above stopped target or moving target, the different value on the X-coordinate is monitored to easily detect the sharp change in the movement direction. In another case, since the calculation origin is not changed, the target path can be reliably calculated by using a number of specified values. As described above, by recalculating a new target path only in a case when sharp change of the specified target in the movement direction can be easily detected, the balance can be appropriately kept between the reduction of the influence of an error of the position detection and the response to the sharp change of the movement direction of the target.

In addition, in the collision reduction apparatus 1, only in a case of a separate target, which is a target existing at a position separated from the own vehicle in the X-axis direction (lateral direction), the change of the calculation origin obtained in S150 is permitted. That is, since the separate target is separated from the own vehicle in the lateral direction, if the movement direction is sharply changed in the lateral direction, the separate target can enter into the region in which the own vehicle is traveling. In another case, since the calculation origin is not changed, the target path can be reliably calculated by using a number of specified values. As described above, by recalculating a new target path only in a case of the target whose movement direction is sharply changed in the lateral direction ahead of the own vehicle, the balance can be kept between the reduction of the influence of an error of the position detection and the response to the sharp change of the movement direction of the target, while the accuracy in determining the probability of a collision with the target, which has suddenly started to cross ahead of the vehicle, is improved.

In addition, in the collision reduction apparatus 1, only in a case where the separate target is a pedestrian or a target related to a pedestrian (e.g. tricycle, bicycle or the like), the change of the calculation origin obtained in S150 is permitted. That is, since the movement speed of a pedestrian or a target related to a pedestrian (pedestrian or the like) is lower, even when the calculation origin is changed, the number of measurement values is easily increased until the own vehicle reaches the predicted arrival position. As described above, by limiting the target, whose movement direction is sharply changed in the lateral direction ahead of the own vehicle, to a pedestrian or the like, the response to the sharp change of the movement direction of the target can be done while reducing the influence of an error of the position detection for all the targets. Furthermore, the accuracy is improved in determining the probability of a collision with a pedestrian or the like which has suddenly started to cross ahead of the vehicle.

OTHER EMBODIMENTS

It will be appreciated that the present invention is not limited to the configurations described above, but any and all modifications, variations or equivalents, which may occur to those who are skilled in the art, should be considered to fall within the scope of the present invention.

For example, according to the path control process (step) of the above embodiment, the calculation origin of the target path is changed (calculation origin changing process (step)) only when the specified target is a pedestrian or the like. However, the specified target is not limited to a pedestrian or the like but may be a vehicle or the like.

In addition, according to the path control process (step) of the above embodiment, the calculation origin changing process (step) is performed only when the specified target is a separate target. However, the specified target is not limited to a separate target but may be a target existing on the route on which the own vehicle travels.

In addition, according to the path control process (step) of the above embodiment, the calculation origin changing process (step) is performed only when the gradient of a proximate part of the target path is within a predetermined range with reference to a gradient parallel to the Y axis. However, the calculation origin changing process (step) may be performed only when the stop of the specified target is detected. Note that, in a method for detecting the stop of the specified target, information such as speed, a steering angle (traveling direction) of the own vehicle may be used.

In addition, according to the path control process (step) of the above embodiment, the calculation origin of the target path is changed to a last specific value. However, the calculation origin of the target path may be changed to a current specified value.

In addition, according to the main process (step) of the above embodiment, a process (step) for specifying a target position (target position specifying process (step)) is performed only when an overlapping portion exists between the radar error region and the image error region. However, even when no overlapping portion exists, the position of a radar target or an image target, which is detected with higher accuracy, may be specified as a target position. In addition, for example, when an overlapping portion exists, confidence of the target position specifying process (step) may be considered to be higher to advance the timing of the collision reduction control. When no overlapping portion exists, confidence of the target position specifying process (step) may be considered to be lower to delay the timing of the collision reduction control.

Note that the collision reduction apparatus 1 of the above embodiment includes sensors of both the millimeter-wave radar 2 and the monocular camera 3, but may include any one of the sensors. That is, in the target position specifying process (step) of the above embodiment, the position of a radar target or the position of an image target may be specified as a target position.

Hereinafter, aspects of the above-described embodiments will be summarized.

The collision probability determination apparatus (1) includes a specifying means, a calculation means, and a determination means.

The specifying means (7, S10 to S60) specifies, of a target detected in a traveling direction of the vehicle, target positions, which are positions of the target on an X-Y plane, on which a width direction of the vehicle is defined as an X-axis with reference to a position of the vehicle, and a longitudinal direction of the vehicle is defined as a Y-axis with reference to the position of the vehicle The calculation means (7, S160 to S170) calculates a target path, which is a path of the target position on the X-Y plane, by using the target positions specified by the specifying means several times, and calculates a predicted arrival position of the target on the X-axis based on the calculated target path.

The determination means (7, S80) determines probability of a collision between the vehicle and the target based on the predicted arrival position calculated by the calculation means.

According to the above configuration, target positions are specified several times. For example, a straight line or a curved line, in which a mean value of the squares of the distances from the specified values becomes the minimum, is obtained as a target path. Hence, the influence of an error of the position detection can be reduced to accurately determine probability of a collision between the vehicle and the detected target. However, when movement direction of the target is sharply changed, if the target path is calculated on average by using the target positions which are specified several times in the past, the accuracy in calculating the predicted arrival position is lowered for a while. As a result, collision probability can be erroneously determined.

To solve the problem, the collision probability determination apparatus further includes a calculation origin changing means (7, S130, S140 to S150). The calculation origin changing means defines the target position specified last time by the specifying means as a last specified value, and defines the target position specified this time by the specifying means as a current specified value. When the calculation origin changing means detects that the target path, whose end point is the last specified value, is a straight line or has a shape related to a straight line and then if a difference value between an X-coordinate of the last specified value and an X-coordinate of the current specified value exceeds a predetermined threshold, the calculation origin changing means changes a calculation origin of the target path calculated by the calculation means to the last specified value or the current specified value.

According to the above configuration, the accuracy in calculating the predicted arrival position can be prevented from being lowered. That is, when the movement direction of the target is sharply changed from the stopped state or the direction in which the vehicle is traveling to the X axis direction (lateral direction), the collision reduction ECU 7 recalculates the target path (trace) from the current specified value (last specified value or current specified value) without using the past specified values specifying the past stopped state or movement state. Hence, the target path is calculated as a path in which the sharp change in the movement direction of the target is heavily weighted without being averaged by the past data (specific values of the processes before the last). Hence, according to the collision reduction apparatus 1, the accuracy in calculating the predicted arrival position can be prevented from being lowered. As a result, probability of a collision between the vehicle and the detected target can be prevented from being erroneously determined.

In addition, the present invention can be realized as a computer program. In particular, the program allows a computer to perform the specifying means, the calculation means, the determination means, and the calculation origin changing means.

The computer program may be incorporated into one or more computers, thereby obtaining advantages similar to those obtained by the collision probability determination apparatus. Note that the computer program may be stored in a recording medium, which is incorporated in a computer, such as a ROM and a flash memory. The computer program may be loaded from the recording medium into the computer, or may be loaded from the recording medium into the computer via a network.

In addition, the computer program may be used in a state of being stored in a computer readable recording device (recording medium). The recording medium includes a portable semiconductor memory (e.g. USB memory, memory card (trademark)).

What is claimed is:

1. A collision reduction apparatus installed in a vehicle, comprising a collision reduction electronic control unit, an engine electronic control unit, and a brake electronic control unit, wherein the collision reduction electronic control unit:
    specifies, of a target detected in a traveling direction of the vehicle, target positions, which are positions of the target on an X-Y plane, on which a width direction of the vehicle is defined as an X-axis with reference to a position of the vehicle, and a longitudinal direction of the vehicle is defined as a Y-axis with reference to the position of the vehicle;
    calculates a target path, which is a path of the target position on the X-Y plane, by using the target positions specified by the collision reduction electronic control unit several times, and calculates a predicted arrival position of the target on the X-axis based on the calculated target path;
    determines a probability of a collision between the vehicle and the target based on the predicted arrival position calculated by the collision reduction electronic control unit;
    defines the target position specified last time by the collision reduction electronic control unit as a last specified value, and defines the target position specified this time by the collision reduction electronic control unit as a current specified value, and, when detecting that the target path, whose end point is the last specified value, is a straight line or has a shape related to a straight line and then if a difference value between an X-coordinate of the last specified value and an X-coordinate of the current specified value exceeds a predetermined threshold, changes a calculation origin of the target path calculated by the collision reduction electronic control unit to the last specified value or the current specified value, and if the difference value between the X-coordinate of the last specified value and the X-coordinate of the current specified value does not exceed the predetermined threshold, does not change the calculation origin of the target path;
    performs a collision reduction control based on the determined probability of the collision between the vehicle and the target by at least one of generating an engine control instruction to an engine electronic control unit to decrease a driving force of the vehicle and generating a braking control instruction to a brake electronic control unit to increase a braking force of the vehicle;
    wherein the engine electronic control unit decreases the driving force of the vehicle in response to receiving the engine control instruction from the collision reduction electronic control unit; and
    wherein the brake electronic control unit increases the braking force of the vehicle in response to receiving the braking control instruction from the collision reduction electronic control unit.

2. The collision reduction apparatus according to claim 1, wherein the collision reduction electronic control unit changes the calculation origin, only when a gradient of a proximate part of the target path calculated last by the collision reduction electronic control unit is within a predetermined range with reference to a gradient parallel to the Y axis.

3. The collision reduction apparatus according to claim 1, wherein the collision reduction electronic control unit changes the calculation origin, only when the target is a separate target existing at a position separated from the vehicle in the X-axis direction.

4. The collision reduction apparatus according to claim 3, wherein the collision reduction electronic control unit changes the calculation origin, only when the separate target is a pedestrian or a target related to a pedestrian.

5. A non-transitory computer readable recording medium storing a computer program with instructions for a computer to perform:
    specifying, of a target detected in a traveling direction of a vehicle, target positions, which are positions of the target on an X-Y plane, on which a width direction of the vehicle is defined as an X-axis with reference to a position of the vehicle, and a longitudinal direction of the vehicle is defined as a Y-axis with reference to the position of the vehicle;
    calculating a target path, which is a path of the target position on the X-Y plane, by using the target positions specified by the specifying several times, and calculating a predicted arrival position of the target on the X-axis based on the calculated target path;
    determining probability of a collision between the vehicle and the target based on the predicted arrival position;
    defining the target position specified last time by the specifying as a last specified value, and defining the target position specified this time by the specifying as a current specified value, and for, when detecting that the target path, whose end point is the last specified value, is a straight line or has a shape related to a straight line and then if a difference value between an X-coordinate of the last specified value and an X-coordinate of the current specified value exceeds a predetermined threshold, changing a calculation origin of the target path to the last specified value or the current specified value, and if the difference value between the X-coordinate of the last specified value and the X-coordinate of the current specified value does not exceed the predetermined threshold, not changing the calculation origin of the target path; and
    performing a collision reduction control based on the determined probability of the collision between the vehicle and the target by at least one of decreasing a driving force of the vehicle and increasing a braking force of the vehicle.

* * * * *